United States Patent
Cho

(10) Patent No.: US 7,408,689 B1
(45) Date of Patent: Aug. 5, 2008

(54) LIGHT SCANNING UNIT AND IMAGE FORMING APPARATUS EMPLOYING THE SAME

(75) Inventor: Hee-sung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/832,754

(22) Filed: Aug. 2, 2007

(30) Foreign Application Priority Data

Feb. 6, 2007 (KR) .................. 10-2007-0012221

(51) Int. Cl.
*G02B 26/08* (2006.01)
*B41J 27/00* (2006.01)

(52) U.S. Cl. ...................... 359/206; 347/259
(58) Field of Classification Search .............. 359/206
See application file for complete search history.

(56) References Cited

U.S. PATENT DOCUMENTS 6,760,138 B2 * 7/2004 Shimomura ............... 359/212
7,068,406 B2   6/2006 Shimomura \* cited by examiner

*Primary Examiner*—James Phan
(74) *Attorney, Agent, or Firm*—Stanzione & Kim, LLP

(57) ABSTRACT

A light scanning unit includes a light source which emits light beam with a predetermined wavelength, a beam deflector which deflects and scans the light beam emitted by the light source toward a photosensitive body, and an f-θ lens which has at least one plastic lens and forms an image for the light deflected by the beam deflector on the photosensitive body, the light scanning unit satisfying a following formula $0 < L_{max} - L_{min} \leq [20 \times (\cos\theta)5 + 10] \times \lambda/(5 \times 10-4)$ where Lmax and Lmin respectively represent a maximum value and a minimum value of a total light passing distance from a light axis of at least one plastic lens according to a deflection angle, θ is an angle formed between a polarization direction of the light beam emitted by the light source and a sub-scanning direction, and λ is a wavelength of the light beam emitted by the light source.

22 Claims, 9 Drawing Sheets

$L_1 = L_{10} + L_{20}$
$L_2 = L_{11} + L_{21}$

US 7,408,689 B1

LIGHT SCANNING UNIT AND IMAGE FORMING APPARATUS EMPLOYING THE SAME

CROSS-REFERENCE TO RELATED APPLICATIONS

This application claims priority under 35 U.S.C. §119(a) from Korean Patent Application No. 10-2007-0012221, filed on Feb. 6, 2007, in the Korean Intellectual Property Office, the disclosure of which is incorporated herein in its entirety by reference.

BACKGROUND OF THE INVENTION

1. Field of the Invention

The present general inventive concept relates to a light scanning unit which scans light emitted by a light source to a surface to be emitted and an image forming apparatus employing the same, and more particularly, to a light scanning unit which narrows light amount ratio differences which occur due to polarization properties of incident light and transmittance differences depending on a deflection angle of a plastic lens, and an image forming apparatus employing the same.

2. Description of the Related Art

Generally, a light scanning unit is employed in an image forming apparatus such as a laser printer, a digital printer and a facsimile, and a bar code reader. The light scanning unit forms a latent image on a photosensitive body by a main scanning of a beam deflector and a sub-scanning by rotation of the photosensitive body.

FIG. 1 illustrates an optical arrangement of a conventional light scanning unit which is disclosed in U.S. Pat. No. 7,068,406B2 issued on Jun. 27, 2006.

As illustrated in FIG. 1, the conventional light scanning unit includes a laser diode 1 which emits light beam, a polygon mirror 5 which deflects incident light to scan the light beam emitted by the laser diode 1 to a photosensitive body 8, and f-θ lenses 6 and 7 which correct errors included in the light beam deflected by the polygon mirror 5. A collimating lens 2, a stop 3, and a cylindrical lens 4 are provided in a light path between the laser diode 1 and the polygon mirror 5. The collimating lens 2 focuses light emitted by the laser diode 1 and the cylindrical lens 4 shapes light.

The light scanning unit employs the laser diode 1 which emits light beam having a short wavelength, approximately 500 nm or less, to reduce a spot size of the scanned light beam. The light scanning unit uses at least one f-θ lens which includes plastic, thereby lowering production costs thereof.

In this case, the amount of light may vary due to light absorption differences within the plastic lens. That is, the transmittance varies due to different light beam passing distances according to a deflection angle from the light axis of the plastic lens, thereby causing difference of light amount ratio in a main scanning direction. Then, the latent image which is formed on the photosensitive body 9 becomes ununiform.

To solve such a problem, the thickness of the conventional f-θ lens including plastic is set to satisfy Formula 1 or Formula 2 below.

$$L_1 - L_2 < 10 \text{ mm} \quad \text{[Formula 1]}$$

$L_1$ and $L_2$ respectively represent a maximum value and a minimum value of a total light beam passing distance depending on the deflection angle from the light axis of at least one plastic lens.

$$L_1 - L_2 < 3 \cdot \log(0.93)/S$$

$$S = \log(1 - 3.55 \times 10^8/\lambda^4) \quad \text{[Formula 2]}$$

Here, $\lambda$ is a wavelength of the light beam emitted by the laser diode 1.

The light scanning unit includes the plastic lens whose $L_1$ and $L_2$ are set to satisfy the Formula 1 or 2 regardless of a rotating direction of the laser diode 1.

The laser diode 1 has such a characteristic that it emits predetermined polarized light, which is changed depending on the arrangement direction. The transmittance difference of the f-θ lens including plastic is approximately 10% in the main scanning direction according to the polarization properties of the light emitted by the laser diode 1.

If the polarization properties of the laser diode 1 are not considered, errors are generated on a large scale and the degree of freedom in an optical design is distorted due to the transmittance differences of the plastic lens.

SUMMARY OF THE INVENTION

The present general inventive concept provides a light scanning unit which scans light beam with a short wavelength light source and at least one plastic lens, and reduces deviation of light amount due to internal absorption of a plastic lens even if polarization properties of incident light is changed, and an image forming apparatus employing the same.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing a light scanning unit, comprising a light source which emits light beam with a predetermined wavelength, a beam deflector which deflects and scans the light beam emitted by the light source toward a photosensitive body, and an f-θ lens which has at least one plastic lens and forms an image for the light deflected by the beam deflector on the photosensitive body, the light scanning unit satisfying a following formula $0 < L_{max} - L_{min} \leq [20 \times (\cos \theta)^5 + 10] \times \lambda/(5 \times 10^{-4})$ where $L_{max}$ and $L_{min}$ respectively represent a maximum value and a minimum value of a total light passing distance from a light axis of at least one plastic lens according to a deflection angle, $\theta$ is an angle formed between a polarization direction of the light beam emitted by the light source and a sub-scanning direction, and $\lambda$ is a wavelength of the light beam emitted by the light source.

The light source may emit light beam having a wavelength of approximately 500 nm or less.

A polarization ratio of the light beam incident to the f-θ lens may satisfy a following formula $0.5 \leq B_S/(B_P+B_S) \leq 1$ where $B_S$ and $B_P$ respectively refer to S polarized light beam and P polarized light beam among light beams incident to the f-θ lens.

The foregoing and/or other aspects of the present general inventive concept can also be achieved by providing an image forming apparatus, comprising: a photosensitive body which forms an electrostatic latent image thereon; a light scanning unit including a light source which emits light beam with a predetermined wavelength, a beam deflector which deflects and scans the light beam emitted by the light source toward a photosensitive body, and an f-θ lens which has at least one plastic lens and forms an image for the light deflected by the beam deflector on the photosensitive body, the light scanning unit satisfying a following formula $0 < L_{max} - L_{min} \leq [20 \times (\cos$ θ)$^5$+10]×λ/(5×10$^{-4}$) where $L_{max}$ and $L_{min}$ respectively represent a maximum value and a minimum value of a total light passing distance from a light axis of at least one plastic lens according to a deflection angle, θ is an angle formed between a polarization direction of the light beam emitted by the light source and a sub-scanning direction, and λ is a wavelength of the light beam emitted by the light source, a developing unit which forms a toner image on the photosensitive body; a transfer unit which transfers the toner image formed on the photosensitive body to a printing medium; and a fusing unit which fuses the image transferred to the printing medium.

The image forming apparatus may further include a collimating lens provided between the light source and the beam deflector to focus incident light, and a cylindrical lens provided between the light source and the beam deflector to shape the incident light.

The foregoing and/or other aspects and utilities of the present general inventive concept can also be achieved by providing light scanning unit usable with an image forming apparatus, including a light source which emits a light beam with a predetermined wavelength, a beam deflector which deflect the light beam emitted by the light source, and an f-θ lens which has at least one plastic lens to compensate for a difference between a center and a side of the deflected light beam according to a maximum value and a minimum value of a total light passing distance from a light axis of at least one plastic lens according to a deflection angle, an angle formed between a polarization direction of the light beam emitted by the light source and a sub-scanning direction, and a wavelength of the light beam emitted by the light source.

The foregoing and/or other aspects and utilities of the present general inventive concept can also be achieved by providing an image forming apparatus, including a photosensitive body, a light scanning unit to emit a light beam with a predetermined wavelength, to deflect the light beam emitted by the light source to the photosensitive body to form an electrostatic latent image, and to compensate for a difference between a center and a side of the deflected light beam according to a maximum value and a minimum value of a total light passing distance from a light axis of at least one plastic lens according to a deflection angle, an angle formed between a polarization direction of the light beam emitted by the light source and a sub-scanning direction, and a wavelength of the light beam emitted by the light source, a developing unit which forms a toner image on the photosensitive body corresponding to the electrostatic latent image, a transfer unit which transfers the toner image formed on the photosensitive body to a printing medium; and a fusing unit which fuses the image transferred to the printing medium.

BRIEF DESCRIPTION OF THE DRAWINGS

These above and/or other aspects and utilities of the present general inventive concept will become apparent and more readily appreciated from the following description of the exemplary embodiments, taken in conjunction with the accompanying drawings of which.

DETAILED DESCRIPTION OF THE PREFERRED EMBODIMENTS

Figure 1:
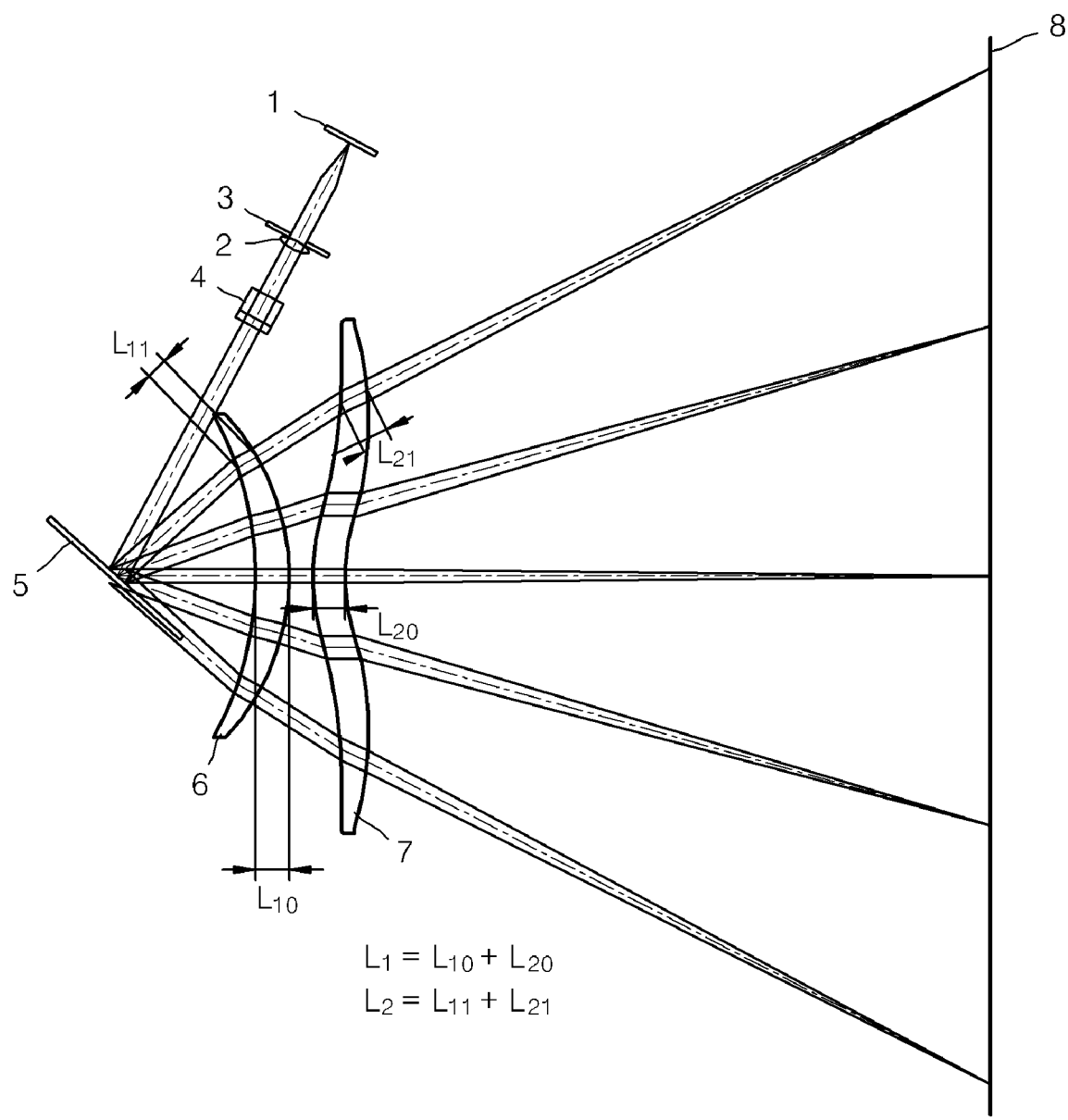
FIG. 1 is a schematic view of a conventional light scanning unit.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
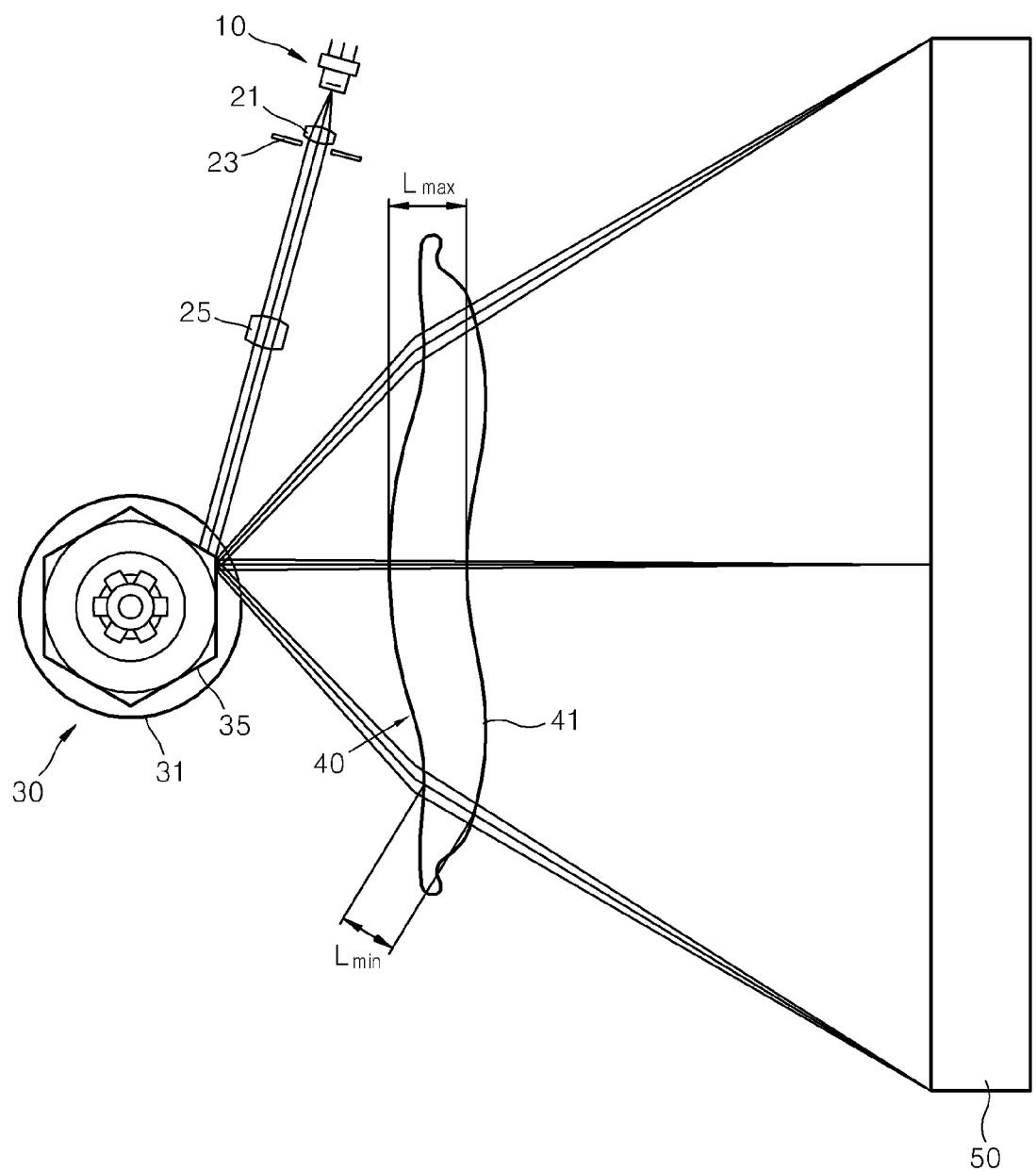
FIG. 2 is a schematic view of a light scanning unit according to an exemplary embodiment of the present general inventive concept.
Figure 3:
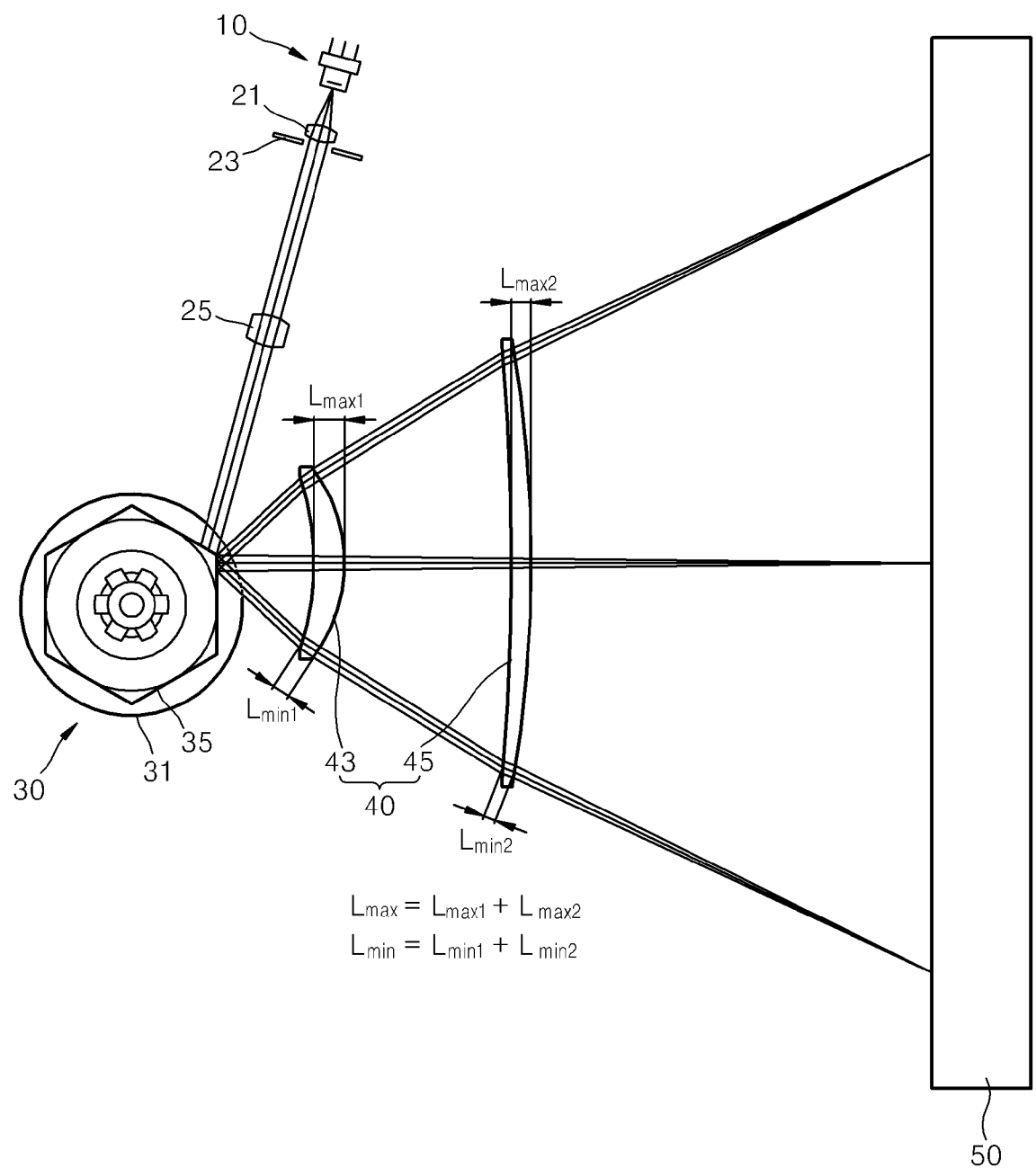
FIG. 3 is a schematic view of a light scanning unit according to another exemplary embodiment of the present general inventive concept.

As shown in FIGS. 2 and 3, a light scanning unit according to an exemplary embodiment of the present general inventive concept includes a light source 10 which emits light beam with a predetermined wavelength, a beam deflector 30 which deflects and scans the light beam emitted by the light source 10 toward a photosensitive body 50, and an f-θ lens 40 which forms an image to the photosensitive body 50 with the light beam scanned by the beam deflector 30. Hereinafter, a main scanning direction refers to an axial direction of the photosensitive body 50, i.e., a direction in which the light beam is deflected through the beam deflector 30. A sub-scanning direction refers to a moving direction of the photosensitive body 50 or a direction perpendicular to the main scanning direction.

The light source 10 may emit light beam with a short wavelength, approximately 500 nm or less. The light source 10 may include a laser diode to emit predetermined polarized light. The short-wavelength light source reduces the light spot size of the light beam scanned to the photosensitive body 50 compared to a long-wavelength light source to be employed in a printer which requires high resolution.

The beam deflector 30 deflects and scans the light beam emitted by the light source 10 to the photosensitive body 50 in the main scanning direction at a predetermined deflection angle. The beam deflector 30 according to the exemplary embodiment of the present general inventive concept includes a driving source 31 which provides a rotation force, and a polygon mirror 35 which is rotatably driven by the driving source 31. The polygon mirror 35 is rotatably driven, and deflects and scans the emitted light beam in the main scanning direction.

The beam deflector 30 is not limited to the polygon mirror 35. Alternatively, the beam deflector 30 may include a Galvanometer mirror, or a hologram disk device which deflects light beam by diffracting incident light beam.

The light scanning unit according to the exemplary embodiment of the present general inventive concept may further include a collimating lens 21 and a cylindrical lens 25 which are provided in a light path between the light source 10 and the beam deflector 30. The collimating lens 21 focuses the light beam emitted by the light source 10, and the cylindrical lens 25 shapes the light beam focused by the collimating lens 21. The light scanning unit according to the exemplary embodiment of the present general inventive concept may further include a stop 23 which controls aperture of incident light beam on the light path between the light source 10 and the beam deflector 30.

The f-θ lens 40 includes at least one plastic lens in consideration of production costs and assembly efficiency.

As illustrated in FIG. 2, the f-θ lens 40 according to the exemplary embodiment of the present general inventive concept may include a single plastic lens 41. The maximum value of the light beam passing distance of the plastic lens 41 on the light axis is $L_{max}$, and the minimum value thereof according to a deflection angle is $L_{min}$. The $L_{max}$ and $L_{min}$ satisfy Formula 3 which will be described later.

As illustrated in FIG. 3, the f-θ lens 40 according to another exemplary embodiment of the present general inventive concept may include first and second lenses 43 and 45. The first and second lenses 43 and 45 of the f-θ lens 40 may be first and second plastic lenses, respectively. The maximum value of the light beam passing distance from the light axis of the first plastic lens 43 on the light axis is $L_{max1}$, and the minimum value thereof according to a deflection angle is $L_{min1}$. The maximum value of the light beam passing distance on the light axis of the second plastic lens 45 is $L_{max2}$, and the minimum value thereof according to a deflection angle is $L_{min2}$. The largest internal light beam passing distance $L_{max}$ within the first and second plastic lenses 43 and 45 is the sum of $L_{max1}$ and $L_{max2}$. The smallest internal light beam passing distance $L_{min}$ is the sum of $L_{min1}$ and $L_{min2}$. The $L_{max}$ and $L_{min}$ thereof satisfy the condition of Formula 3.

One of the first and second lenses 43 and 45 of the f-θ lens 40 may include a plastic lens. Then, the $L_{max}$ and $L_{min}$ are defined as those of the f-θ lens 40 in FIG. 2.

As described above, if the f-θ lens 40 includes at least one plastic lens and the emitted light beam has a wavelength of approximately 500 nm or less, light loss occurs due to light absorption inside the plastic lens.

Figure 4:
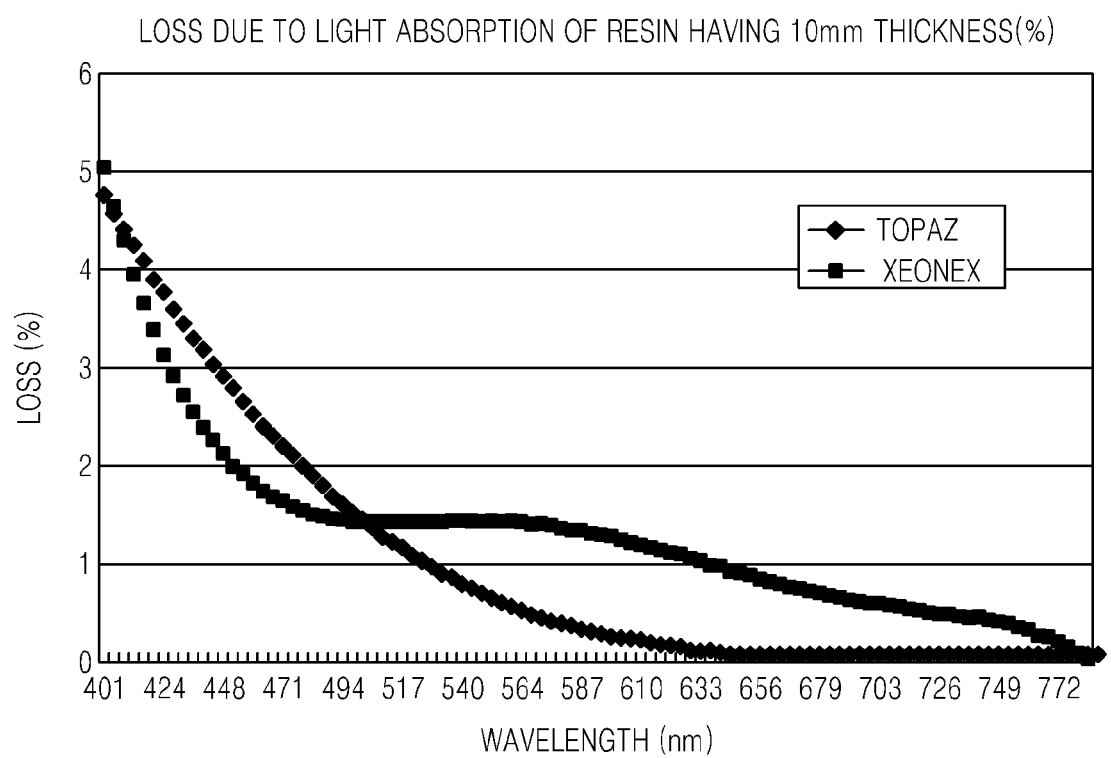
FIG. 4 is a graph which illustrates loss due to light absorption caused by wavelength changes in a light source.

FIG. 4 is a graph which illustrates light loss due to light absorption caused by wavelength changes of a resin included in a plastic lens.

Referring to FIGS. 2, 3, and 4, the resin which is used for the experiment is Topaz and Zeonex manufactured by Zeon Corp. and includes vinyl cyclic hydrocarbon polymer. A thickness of Topaz and Zeonex are 10 mm. A wavelength of the light emitted to the resin ranges from 401 nm to 772 nm. Less than about 1.5% loss occurs due to light absorption in the wavelength area of 500 nm and above. However, the loss drastically increases to approximately 5% in a short wavelength area. If the light scanning unit employs the light source 10 which emits the light beam with the short-wavelength, the light loss due to absorption of the plastic lens needs to be compensated.

The light source 10 including the laser diode has predetermined polarization properties as explained above. The polarization properties depending on the arrangement of the light source 10 will be described with reference to FIGS. 5A to 5C.

Figure 5A:
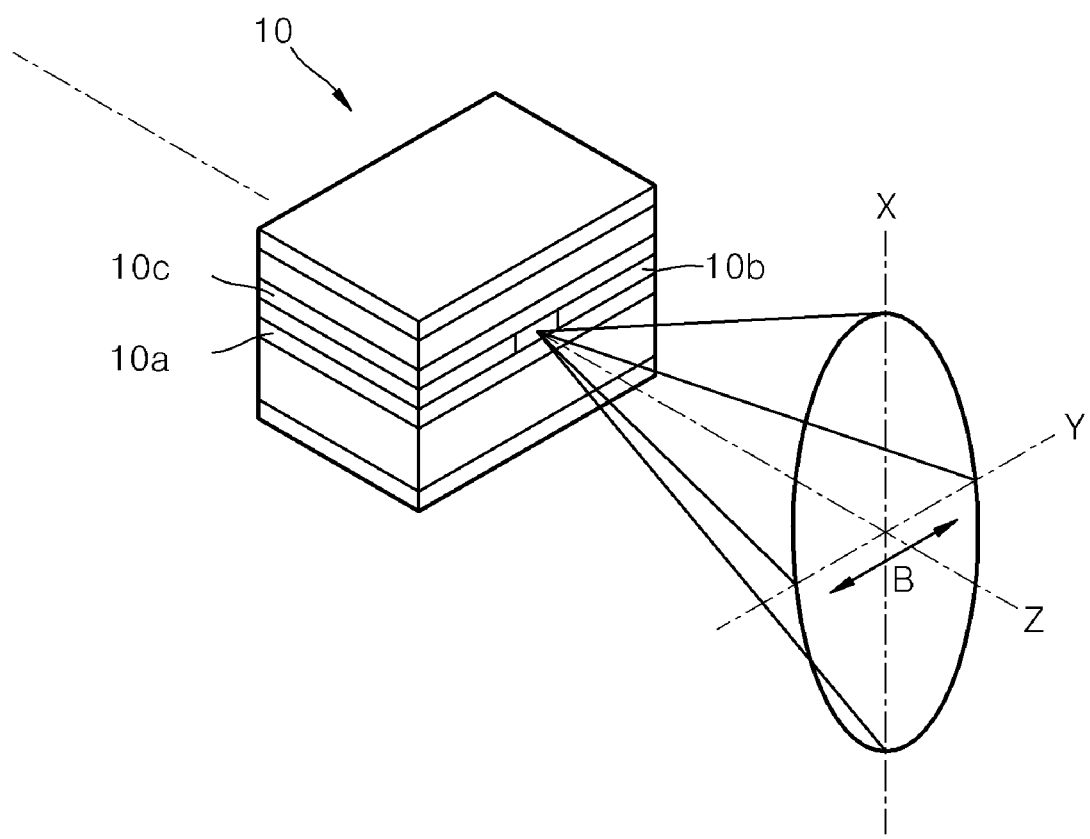
FIGS. 5A to 5C illustrate various polarization properties depending on rotating angles of a light source.
Figure 5B:
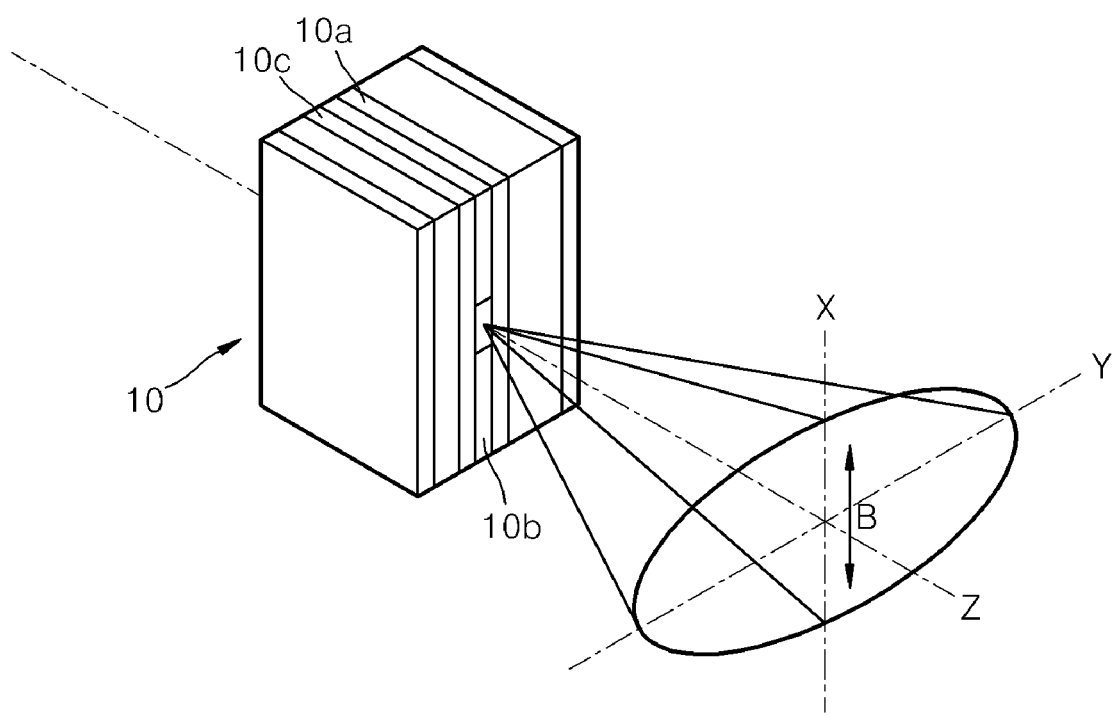
Figure 5C:
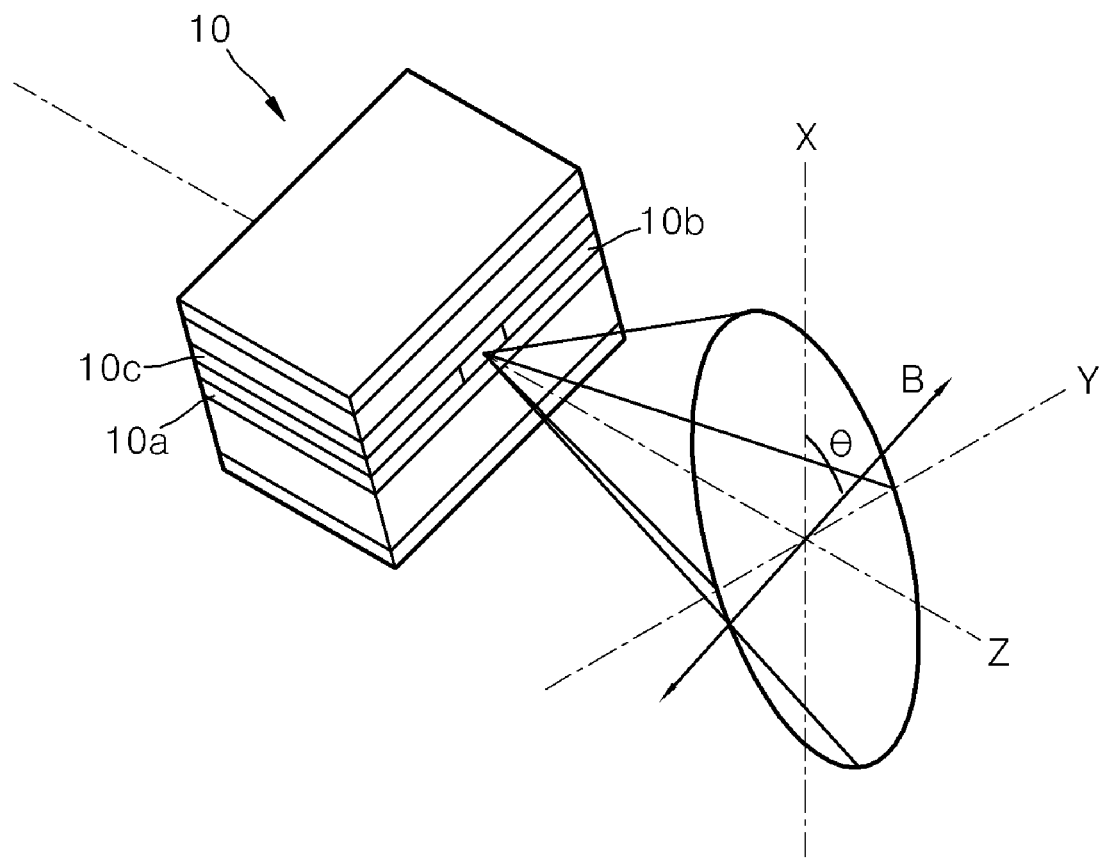

FIGS. 5A to 5C illustrate polarization properties if a light source employs an edge-emitting laser diode. FIGS. 5A and 5B illustrate P-polarized light and S polarized light, respectively. FIG. 5C illustrates a case that the laser diode is inclined as much as an angle θ with respect to a reference axis.

Referring to FIGS. 2-5C, the light source 10 includes a lower clad layer 10a, an active layer 10b and an upper clad layer 10c. The light beam is emitted from a lateral side of the active layer 10b. Here, the light beam emitted from the active layer 10b has an elliptical section due to astigmatism of the edge-emitting laser diode. The emitted light beam is at least 95% linearly-polarized.

As illustrated in FIG. 5A, a polarization direction of an electric field is illustrated with a two-way arrow B. If the arrow B is transverse (axis Y direction) to an incident surface of the beam deflector 30 (refer to FIG. 2), it is a P polarization. If the arrow B is vertical (axis X direction) to the incident surface thereof, it is an S polarization. FIG. 5C illustrates an elliptical polarization, which is combined P polarized light and S polarized light determined by the rotating angle θ with predetermined polarization rate.

Figure 6:
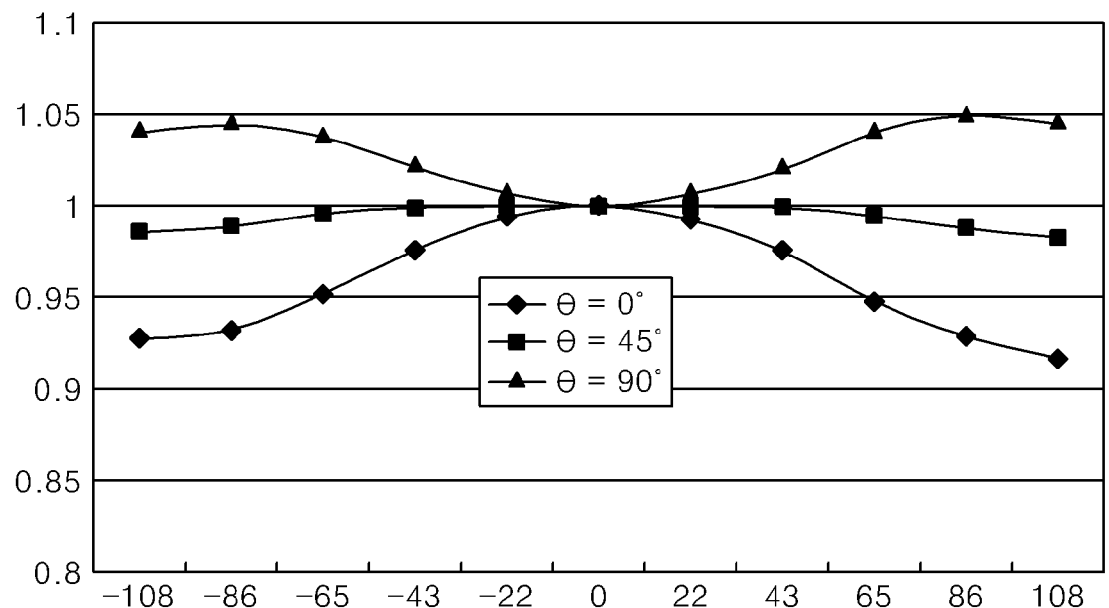
FIG. 6 is a graph which illustrates transmittance differences of an f-θ lens due to various rotating angles of a light source.

FIG. 6 is a graph to illustrate transmittance differences of the f-θ lens 40 depending on the rotating angle θ of the light source 10. Here, a transverse coordinate may be a lengthwise direction of the f-θ lens 40 while a vertical coordinate is relative transmittance of the f-θ lens 40 in the lengthwise direction if the rotating angle is 0°, 45° and 90° (the transmittance in the center of the f-θ lens 40 is supposed to be 1). As illustrated in FIG. 6, the transmittance of the f-θ lens 40 in the lengthwise direction varies depending on the rotating angle θ of the light source 10. Thus, the light scanning unit according to the exemplary embodiment of the present general inventive concept is set in consideration of the arrangement of the light source 10.

The light scanning unit according to the exemplary embodiment of the present general inventive concept satisfies the condition of Formula 3 in consideration of the compensation for the light loss due to the light absorption according to material selection of the f-θ lens 40, and the polarization properties of the light source 10.

$$0 < L_{max} - L_{min} \leq [20 \times (\cos \theta)^5 + 10] \times \lambda / (5 \times 10^4) \quad \text{[Formula 3]}$$

Here, $L_{max}$ and $L_{min}$ respectively represent a maximum value and a minimum value of a total light passing distance of at least one plastic lens according to the deflection angle from the axis of light beam. θ is an angle formed between the polarization direction of the light beam emitted by the light source 10 and the sub-scanning direction while λ is a wavelength of the light beam emitted by the light source 10.

The polarization rate of the light beam emitted by the light source 10 may satisfy Formula 4.

$$0.5 \leq B_S / (B_P + B_S) \leq 1 \quad \text{[Formula 4]}$$

Here, $B_S$ and $B_P$ respectively represent S polarized light beam and P polarized light beam among light beam incident to the f-θ lens 40. The sum of $B_P$ and $B_S$ is 1. If the range of the polarization rate is set as above, the decreased transmittance in a center of the f-θ lens 40 may be compensated as long as the Formula 3 is satisfied. If the Formula 4 is satisfied, the transmittance of the f-θ lens 40 is higher in the center than in a side of thereof according to Snell's law. Thus, the reduced transmittance in the center of the f-θ lens 40 which occurs due to the light absorption of the f-θ lens 40 including plastic may be compensated.

The transmittance differences according to various polarization directions of the light source 10 will be described when the conditions of the Formulas 3 and 4 are satisfied.

As described above, the inclination angle formed between the polarization direction of the light source 10 and the sub-scanning direction, i.e., +X axis, is θ. If θ=0°, the emitted light beam becomes the S polarized light seen from a reflection surface of the polygon mirror 35. The transmittance differences according to the polarization direction will be described with reference to FIG. 6. The transmittance reduces by approximately 8% in the side area compared to the center of the f-θ lens 40.

If the condition of the Formula 3 is satisfied, θ=0°. If λ=400 nm, $L_{max} - L_{min} < 24$ nm. If the wavelength of the light source 10 is 400 nm, and if $L_{max}$ is 20 mm, the transmittance difference between the center area and the side area of the f-θ lens 40 is approximately 10%. That is, the transmittance reduces by about 11% in the center area compared to the side area of the f-θ lens 40.

When the transmittance differences and the internal light absorption of the f-θ lens 40 are added, the center of the f-θ lens 40 has about 3% lower transmittance than the side area thereof. Such a result is reflected upon the latent image formed in the photosensitive body 50, and the center of the latent image reduces by about 3% more than the side thereof.

If the S polarized light beam is emitted, the transmittance difference of the light beam emitted to the center and the side area of the f-θ lens 40 may be reduced within about 3%. As the difference between $L_{max}$ and $L_{min}$ may expand to 24 mm, the degree of freedom in designing the light scanning unit may improve.

If θ=90°, the emitted light becomes P polarized light seen from the reflection surface of the polygon mirror 35. Then, since the transmittance difference and the internal light absorption of the f-θ lens 40 are reinforced, the difference due to the internal light absorption should be minimized. Accordingly, in consideration of the degree of freedom in designing the f-θ lens 40, $L_{max}-L_{min}<8$ mm. The transmittance difference between the center and the side area which is caused by the $L_{max}$ has a small value, approximately 4%.

If θ=90°, the difference of the light amount ratio difference due to the internal light absorption of the f-θ lens 40 has the maximum value of 10% when calculating it under the conditions according to the exemplary embodiment of the present general inventive concept as per the Formulas 1 and 2. Meanwhile, the light scanning unit according to the exemplary embodiment of the present general inventive concept may dramatically reduce the difference to approximately 4%.

Figure 7:
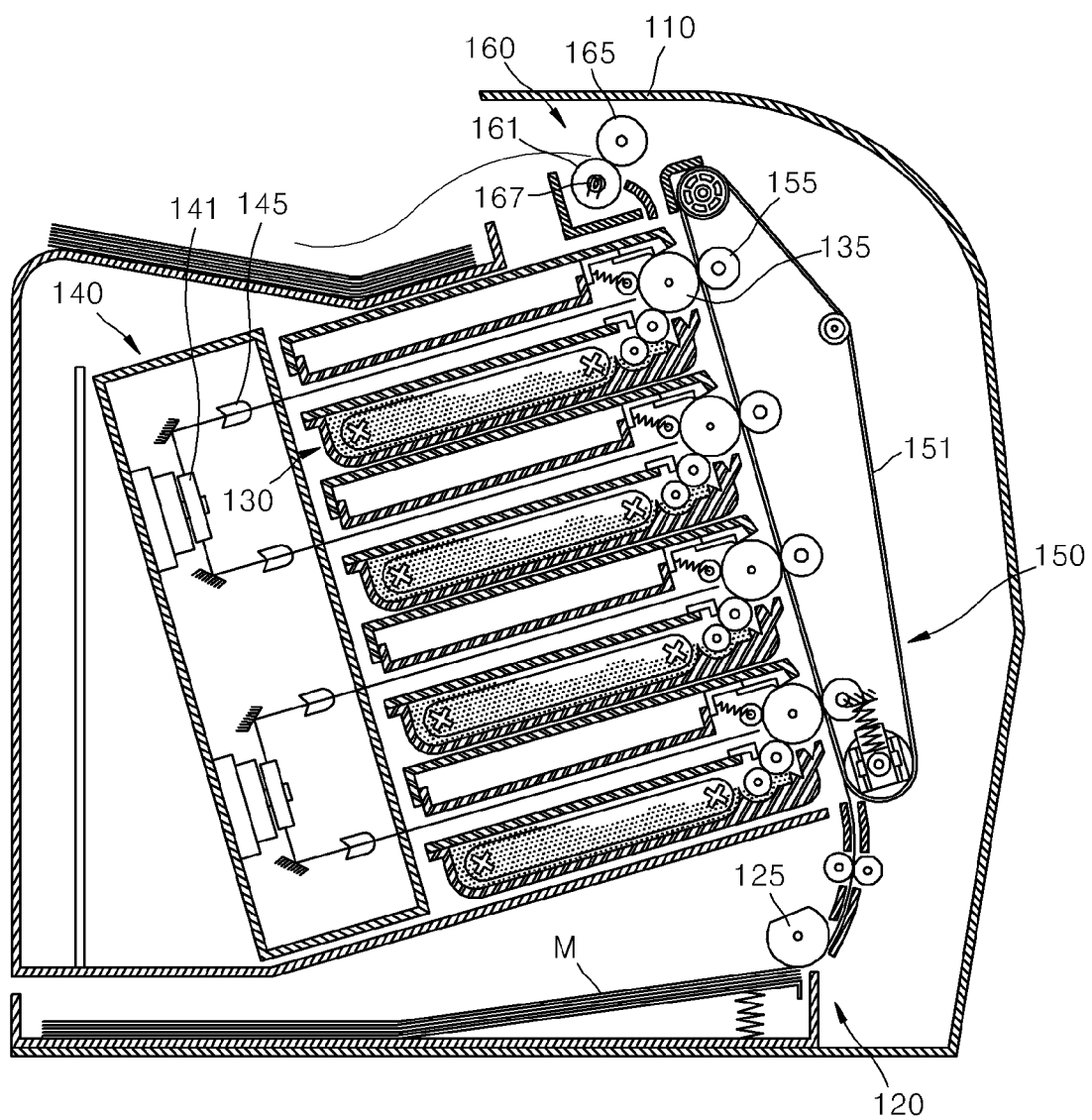
FIG. 7 is a schematic view of an image forming apparatus according to the exemplary embodiment of the present general inventive concept.

As illustrated in FIG. 7, an image forming apparatus according to the exemplary embodiment of the present general inventive concept includes a tandem type color image forming apparatus. The image forming apparatus includes a cabinet 110 as a housing or a main body, and a developing unit 130, a light scanning unit 140, a transfer unit 150 and a fusing unit 160 which are provided inside the cabinet 110.

The cabinet 110 forms an external appearance of the image forming apparatus. A supplying unit 120 is detachably provided in the cabinet 110 to store a printing medium M therein. The printing medium M stored in the supplying unit 120 is picked up by a pick up roller 125, and transferred between the developing unit 130 and the transfer unit 150 through a moving route.

The developing unit 130 includes a photosensitive body 135 which forms an electrostatic latent image thereon by light beam scanned by the light scanning unit 140. A toner which is accommodated in the developing unit 130 is developed on the photosensitive body 135 to form a toner image on the photosensitive body 135.

The developing unit 130 may be provided in plural to form a full color image through a single pass method. FIG. 7 exemplarily illustrates four developing units 130 to realize yellow, magenta, cyan and black colors, respectively.

The light scanning unit 140 scans the light beam for the electrostatic latent image to be formed on the plurality of photosensitive bodies 135. The light scanning unit 140 has a multi-beam scanning configuration to simultaneously scan the beam to the plurality of photosensitive bodies 135. The light scanning unit 140 includes a light source (not illustrated), a beam deflector 141 which deflects and scans the light beam emitted by the light source, and an f-θ lens 145 which scans and forms an image of the light beam deflected by the beam deflector 141 onto the photosensitive bodies 135. The light source may include a configuration of a semiconductor element having a plurality of light emitting points, or may include a configuration of semiconductor elements, each of which has a single light emitting point corresponding to each color. The beam deflector 141 may include two polygon mirrors. The respective polygon mirrors deflect and scan the two light beams emitted by the light source in different routes. The f-θ lens 145 is provided on four routes deflected and scanned by the beam deflector 141. The respective routes have a single lens. Thus, the f-θ lens 145 may independently scan the light beam with respect to the plurality of photosensitive bodies 135 adjacent to each other.

The configuration of the light scanning unit 140 is substantially equal to that according to the exemplary embodiment of the present general inventive concept as illustrated in FIGS. 2-6. Thus, the detailed description thereof will be avoided here.

The transfer unit 150 faces the photosensitive bodies 135, controlling the printing medium M to move through the moving route therebetween, and transfers the toner image formed on the photosensitive bodies 135 to the printing medium M. The transfer unit 150 includes a transfer belt 151 which faces the plurality of photosensitive bodies 135, and a transfer backup roller 155. The image transferred to the printing medium M through the transfer unit 150 is fused by the fusing unit 160.

The fusing unit 160 includes a heating roller 161, a pressure roller 165 and a heat source 167. A surface of the heating roller 161 is heated by heat generated from the heat source 167 and pressed with the pressure roller 165, thereby fusing the image transferred to the printing medium M.

The light scanning unit according to the present general inventive concept has the optical configuration to satisfy the condition of the Formula 3 to improve the transmittance difference between the center and the side area due to the polarization properties according to the optical arrangement of the light source and the deflection angle of the plastic f-θ lens. The light scanning unit according to the present general inventive concept may form the latent image uniformly on the photosensitive bodies without being affected by the polarization properties of the light source and the light absorption of the f-θ lens. If θ=0° in the Formula 3, the difference between the $L_{max}$ and $L_{min}$ may expand to 24 mm, thereby improving the degree of freedom in designing the light scanning unit.

Even if θ=90°, the condition of the Formula 3, i.e., $L_{max}-L_{min}<8$ mm, is satisfied. The difference between the center and the side area which is caused by the $L_{max}$ may have a small value, approximately 4%, thereby less lowering picture quality due to the transmittance differences.

The light scanning unit according to the present general inventive concept satisfies the condition of the Formula 4, and has the center transmittance higher than the side area transmittance of the f-θ lens according to Snell's law. The light scanning unit compensates for the lower center area transmittance than the side area transmittance due to selection of the material of the f-θ lens, thereby further narrowing the transmittance differences over the whole lens.

The image forming apparatus according to the present general inventive concept employs the light scanning unit described above to increase resolution, and form a uniform image having approximately 4% transmittance difference between the center area and side area in the scanning direction without being affected by the polarization properties of the incident light, thereby preventing image errors. Thus, the image forming apparatus improves printing quality, too.

Although a few exemplary embodiments of the present general inventive concept have been shown and described, it will be appreciated by those skilled in the art that changes may be made in these exemplary embodiments without departing from the principles and spirit of the invention, the scope of which is defined in the appended claims and their equivalents.

What is claimed is:

1. A light scanning unit usable with an image forming apparatus, comprising:
    a light source which emits light beam with a predetermined wavelength;
    a beam deflector which deflects and scans the light beam emitted by the light source toward a photosensitive body; and
    an f-θ lens which has at least one plastic lens and forms an image corresponding to the light deflected by the beam deflector on the photosensitive body,
    the light scanning unit satisfying a following formula $0<L_{max}-L_{min}\leq[20\times(\cos\theta)^5+10]\times\lambda/(5\times10^{-4})$ where $L_{max}$ and $L_{min}$ respectively represent a maximum value and a minimum value of a total light passing distance from a light axis of at least one plastic lens according to a deflection angle, θ is an angle formed between a polarization direction of the light beam emitted by the light source and a sub-scanning direction, and λ is a wavelength of the light beam emitted by the light source.

2. The light scanning unit according to claim 1, wherein the light source emits light beam having a wavelength of approximately 500 nm or less.

3. The light scanning unit according to claim 2, wherein a polarization ratio of the light beam incident to the f-θ lens satisfies a following formula $0.5\leq B_S/(B_P+B_S)\leq 1$ where $B_S$ and $B_P$ respectively refer to S polarized light beam and P polarized light beam among light beams incident to the f-θ lens.

4. The light scanning unit according to claim 3, wherein:
    the f-θ lens comprises two lenses which are provided between the beam deflector and the photosensitive body; and
    at least one of the lenses comprises a plastic lens.

5. The light scanning unit according to claim 3, wherein the f-θ lens comprises a single plastic lens which is provided between the beam deflector and the photosensitive body.

6. The light scanning unit according to claim 2, wherein:
    the f-θ lens comprises two lenses which are provided between the beam deflector and the photosensitive body; and
    at least one of the lenses comprises a plastic lens.

7. The light scanning unit according to claim 2, wherein the f-θ lens comprises a single plastic lens which is provided between the beam deflector and the photosensitive body.

8. The light scanning unit according to claim 1, wherein:
    the f-θ lens comprises two lenses which are provided between the beam deflector and the photosensitive body; and
    at least one of the lenses comprises a plastic lens.

9. The light scanning unit according to claim 1, wherein the f-θ lens comprises a single plastic lens which is provided between the beam deflector and the photosensitive body.

10. The light scanning unit according to claim 1, wherein the beam deflector comprises a driving source which provides a rotation force, and a polygon mirror which is rotatably driven by the driving source, and deflects and scans the light beam emitted by the light source.

11. The light scanning unit according to claim 1, further comprising:
    a collimating lens which is provided between the light source and the beam deflector to focus incident light, and a cylindrical lens which is provided between the light source and the beam deflector to shape the incident light.

12. An image forming apparatus, comprising:
    a photosensitive body which forms an electrostatic latent image thereon;
    a light scanning unit including a light source which emits light beam with a predetermined wavelength, a beam deflector which deflects and scans the light beam emitted by the light source toward the photosensitive body, and an f-θ lens which has at least one plastic lens and forms an image corresponding to the light deflected by the beam deflector on the photosensitive body, the light scanning unit satisfying a following formula $0<L_{max}-L_{min}\leq[20\times(\cos\theta)^5+10]\times\lambda/(5\times10^{-4})$ where $L_{max}$ and $L_{min}$ respectively represent a maximum value and a minimum value of a total light passing distance from a light axis of at least one plastic lens according to a deflection angle, θ is an angle formed between a polarization direction of the light beam emitted by the light source and a sub-scanning direction, and λ is a wavelength of the light beam emitted by the light source;
    a developing unit which forms a toner image on the photosensitive body;
    a transfer unit which transfers the toner image formed on the photosensitive body to a printing medium; and
    a fusing unit which fuses the image transferred to the printing medium.

13. The image forming apparatus according to claim 12, wherein the light source emits light beam having a wavelength of approximately 500 nm or less.

14. The image forming apparatus according to claim 13, wherein:
    the f-θ lens comprises two lenses which are provided between the beam deflector and the photosensitive body; and
    at least one of the lenses comprises a plastic lens.

15. The image forming apparatus according to claim 13, wherein the f-θ lens comprises a single plastic lens which is provided between the beam deflector and the photosensitive body.

16. The image forming apparatus according to claim 12, wherein a polarization ratio of the light beam incident to the f-θ lens satisfies a following formula $0.5\leq B_S/(B_P+B_S)\leq 1$ where $B_S$ and $B_P$ respectively refer to S polarized light beam and P polarized light beam among light beams incident to the f-θ lens.

17. The image forming apparatus according to claim 16, wherein:
    the f-θ lens comprises two lenses which are provided between the beam deflector and the photosensitive body; and
    at least one of the lenses comprises a plastic lens.

18. The image forming apparatus according to claim 16, wherein the f-θ lens comprises a single plastic lens which is provided between the beam deflector and the photosensitive body.

19. The image forming apparatus according to claim 12, wherein:
    the f-θ lens comprises two lenses which are provided between the beam deflector and the photosensitive body; and
    at least one of the lenses comprises a plastic lens.

20. The image forming apparatus according to claim 12, wherein the f-θ lens comprises a single plastic lens which is provided between the beam deflector and the photosensitive body.

21. The image forming apparatus according to claim 12, wherein the beam deflector comprises a driving source which provides a rotation force, and a polygon mirror which is rotatably driven by the driving source, and deflects and scans the light beam emitted by the light source.

22. The image forming apparatus according to claim 12, further comprising:
a collimating lens which is provided between the light source and the beam deflector to focus incident light, and
a cylindrical lens which is provided between the light source and the beam deflector to shape the incident light.

* * * * *